US011362615B1

(12) United States Patent
Washabaugh et al.

(10) Patent No.: US 11,362,615 B1
(45) Date of Patent: Jun. 14, 2022

(54) MODEL-BASED CURRENT LIMITER FOR AN ELECTRIC MOTOR

(71) Applicant: Amazon Technologies, Inc., Seattle, WA (US)

(72) Inventors: Kyle Michael Washabaugh, Seattle, WA (US); Nathaniel James Banka, Seattle, WA (US); Aleksandar Kojic, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/914,865

(22) Filed: Jun. 29, 2020

(51) Int. Cl.
*G05B 5/00* (2006.01)
*H02P 29/64* (2016.01)
*H02P 29/02* (2016.01)

(52) U.S. Cl.
CPC .............. *H02P 29/64* (2016.02); *H02P 29/02* (2013.01)

(58) Field of Classification Search
CPC .......... H02P 29/64; H02P 29/02; H02P 29/68; H02P 8/12; H02P 29/66; H02P 29/32; H02P 29/60
See application file for complete search history.

(56) References Cited

FOREIGN PATENT DOCUMENTS

| CN | 102566434 A | * | 7/2012 | |
| CN | 107710598 A | * | 2/2018 | ............. H02K 11/25 |

* cited by examiner

*Primary Examiner* — Karen Masih
(74) *Attorney, Agent, or Firm* — Klarquist Sparkman, LLP

(57) ABSTRACT

A current limiter for protecting a motor from overheating. An algorithm is disclosed for dynamically limiting the motor current, such as motors used in robotics. The algorithm uses a thermal model of the motor, which provides a real-time estimate of a coil temperature using instantaneous power consumption of the motor and a thermocouple measurement from the motor's printed circuit board. There are multiple potential outputs from the current limiter algorithm, such as the maximum power that can be consumed without overheating the coils, and an estimate of how long the motor could deliver a specified high torque before overheating.

20 Claims, 6 Drawing Sheets

MODEL-BASED CURRENT LIMITER FOR AN ELECTRIC MOTOR

BACKGROUND

Electric motors, such as wheel hub motors, have numerous applications, such as robotics, electric bicycles, electric motorcycles, etc. The coils of such motors can be damaged when too much power is supplied, especially for an extended period of time.

For this reason, a temperature-based current limiter can be used to protect the motor. Current limiting is the practice of imposing an upper limit on current delivered to motors to protect the motors from overheating. Implementing a temperature-based current limiter for an electric motor is simple if coil temperatures can be measured directly, however direct measurement of the coil temperature is not always feasible due to added cost and complexity.

DETAILED DESCRIPTION

An algorithm is disclosed for dynamically limiting coil temperature of an electric motor, such as motors used in robotics. The algorithm uses a thermal model of the motor, which provides a real-time estimate of a coil temperature using instantaneous power consumption of the motor and a thermocouple measurement from inside of the motor, such as from the motor's printed circuit board. There are multiple potential uses of the thermal model, such as estimating the maximum power that can be applied for a specified time duration without overheating the coils, or estimating how long the motor could deliver a specified high torque before overheating. These two quantities are referred to as the "power limit" and the "maneuver budget", respectively.

The "power limit" is used to limit the electrical current provided to the motor, ensuring that the estimated coil temperature remains below a specified value. This model-based current limiter allows the motors to be safely operated without any direct measurements of the coil temperature, reducing cost and complexity.

The "maneuver budget" is used to avoid triggering the current limiter during a long or demanding maneuver. Maneuvers requiring significant amounts of power, such as climbing a hill, are only performed when the maneuver budget is sufficiently large. This prevents situations where the vehicle is unable to complete a maneuver due to hot motors.

Figure 1:
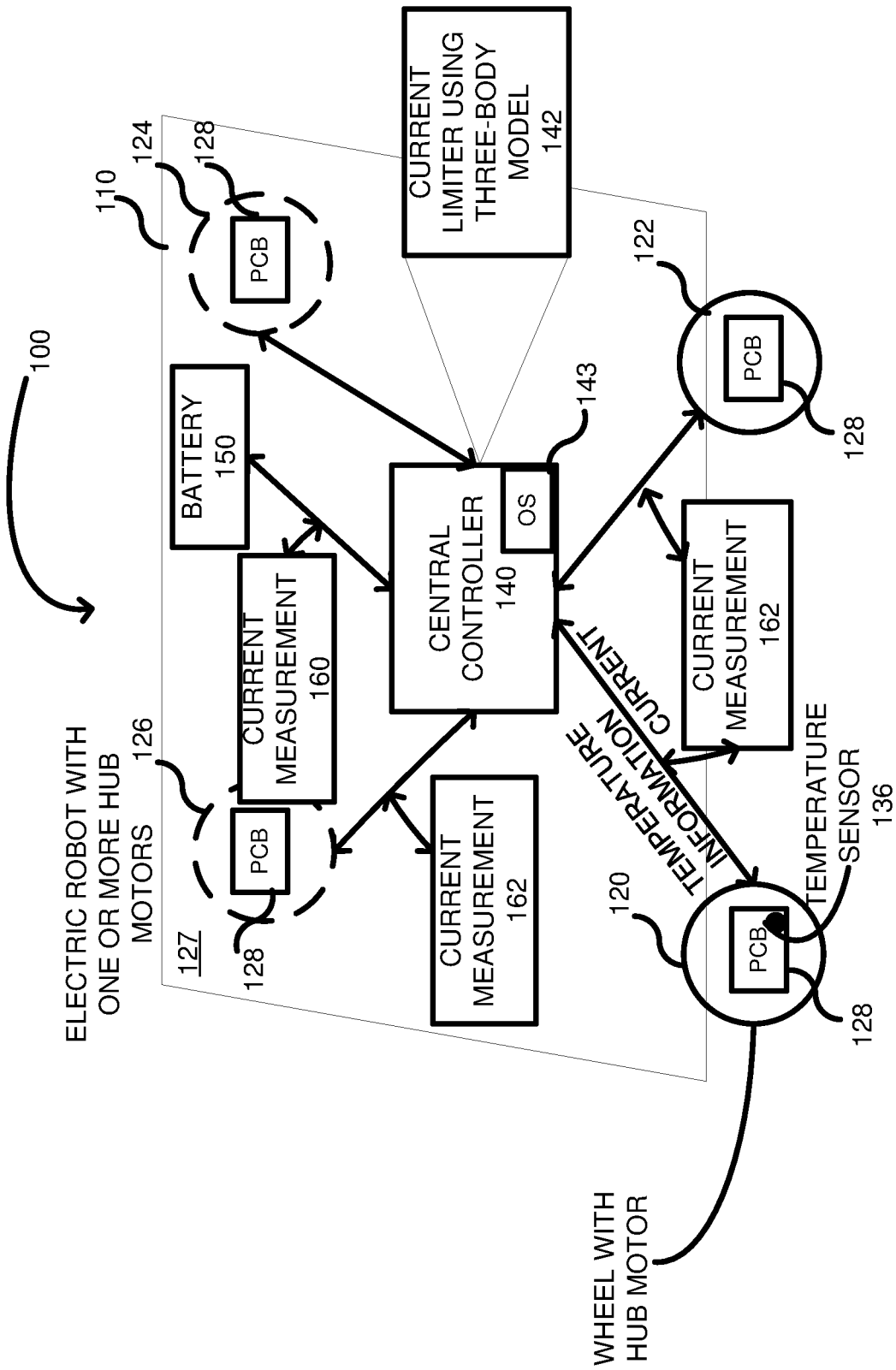
FIG. 1 is an example schematic diagram of a robot including multiple hub motors with a central controller acting as a current limiter using a three-body model to estimate the temperature of the coils on the hub motors.

FIG. 1 is a system diagram 100 of an electric robot 110 that implements a current limiter using a thermal model of coil temperature. Although a robot is shown, the current limiter can be used for other motor-driven devices, such as electric bicycles, electric cars, etc. The electric robot 110 includes four hub motors 120, 122, 124, 126 that drive wheels of the robot. The hub motors are attached to a platform or base 127. A hub motor is an electric motor that is incorporated into a hub of a wheel and directly drives the wheel. Although hub motors are shown, the current limiter can be applied to other types of electric motors, such as brushed motors, brushless motors, series motors, shunt motors, three-phase motors, etc. Each hub motor includes a printed circuit board (PCB) 128. A temperature sensor 136 is positioned in the hub motor 120. For simplicity, the temperature sensor 136 is not shown on each hub motor 122, 124, 126, but it is understood that in at least one embodiment, each hub motor has a corresponding temperature sensor. The temperature sensor is not embedded in any of the motor coils, so it cannot obtain an exact temperature of the coils because it is not touching the coils. Rather, it is positioned to obtain a general temperature of the motor assembly. A central controller 140 is coupled to each of the hub motors 120, 122, 124, 126, and uses software to perform the function of a current limiter 142 using a three-body thermal model. The software 142 can provide instructions to an operating system 143, which can be the software that limits the current or enforces the maneuver budget. For ease of explanation, three thermal bodies can be thought of as the coils, the core and the case for purposes of understanding the model. However, it will be understood that any heat conducting object between the coils and where a measurement is obtained could be used as a model body. A battery 150 provides power to the hub motors 120, 122, 124, 126 and to the central controller 140. Various current measurements can be used for the three-body model. For example, a current measurement device 160 measures a total current provided from the battery 150. Other current measurement devices 162 measure a current being provided to each hub motor (not all current measurement devices are shown for simplicity). Either or both types of current readings can be used in the current limiter three-body model 142.

The current limiter using the three-body model 142 receives, for one or more of the hub motors, temperature information and current information and uses such information to produce a power limit and/or a maneuver budget. The power limit can be expressed in units of power, current, voltage, or predicted temperature of the coils. The maneuver budget can be an integer number of seconds, such as 10 seconds, that a predetermined amount of current (e.g., maximum current) can be applied to the motor without overheating the coils. Thus, the central controller 140 can instruct other software executing on the central controller or external software that the robot 100 can operate for 10 seconds at maximum power without overheating. This allows an operator or robot control program to know when the motors are cool enough to perform a demanding maneuver, such as climbing a hill.

Figure 2:
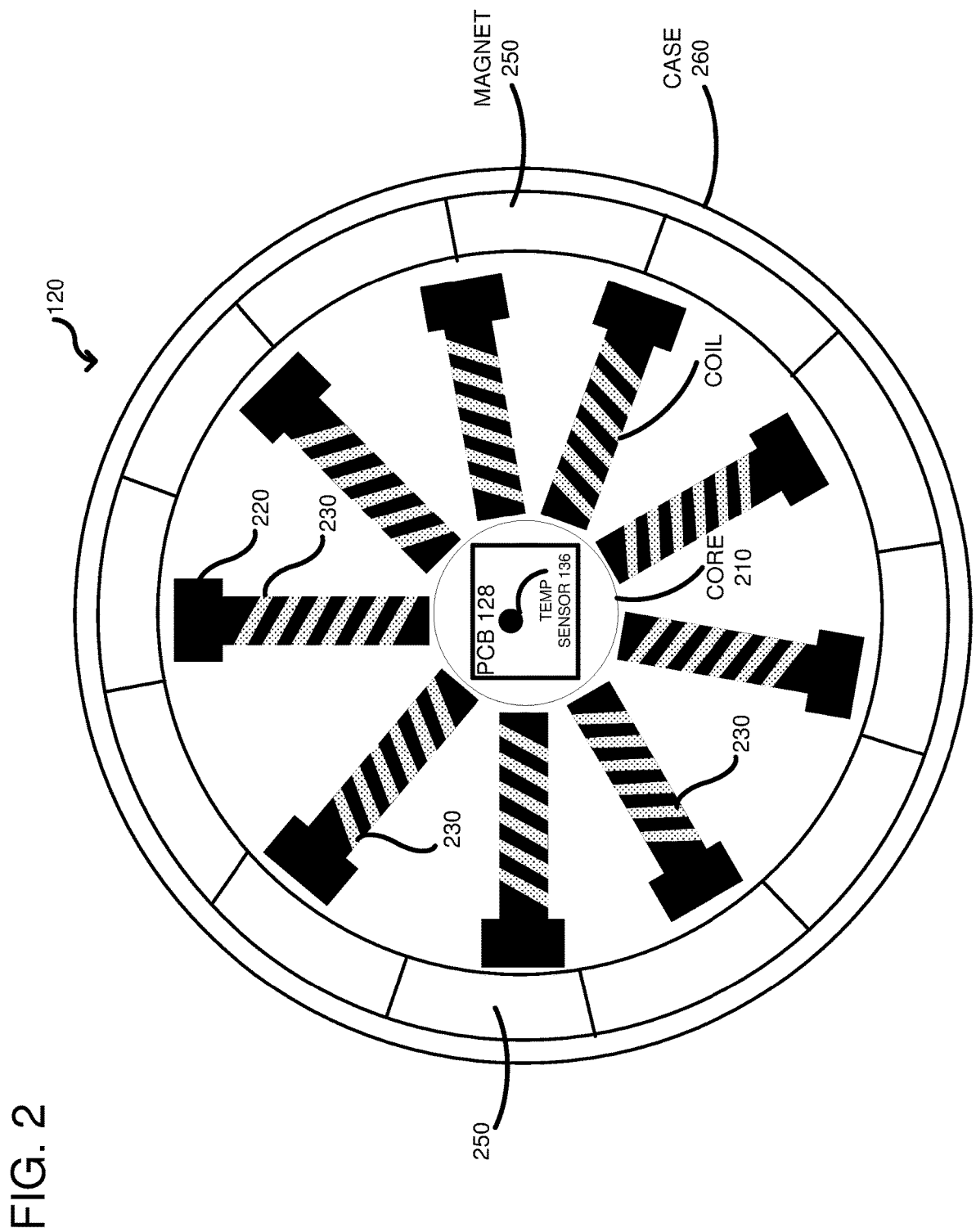
FIG. 2 is a hub motor having multiple coils positioned on a core with a printed circuit board (PCB) having a temperature sensor substantially centrally located to receive heat from the coils.

FIG. 2 shows an example of the hub motor 120 of FIG. 1. The hub motor 120 includes a core 210, which is typically metal, with a plurality of spokes, such as spoke 220, around one end thereof. Each spoke has a wire coil 230 wrapped along its length. A PCB 128 is located somewhere in the motor, such as at the center near an end of the core 210. The PCB 128 includes the temperature sensor 136, which is the only temperature sensor in this embodiment and is substantially centrally located and spaced-apart from the coils to obtain heat from multiple of the coils approximately equally. By using a single temperature sensor, cost savings are realized. Additionally, temperature sensors, if positioned on the coils, have a higher failure rate due to the high heat. The temperature sensor 136, by obtaining heat from the multiple coils, acts as an ambient temperature sensor. Although not shown, the PCB 128 is coupled to the coils 230 and controls a level of current applied to selected coils.

The coils are surrounded by magnets 250 that can rotate on a bearing (not shown). An outer case 260 is typically made of metal and also absorbs heat. Different configurations are possible. For example, the PCB 128 can be mounted to the case 260 and/or the temperature sensor 138 can be positioned on the case 260. Additional temperature sensors can be added to obtain an ambient temperature. However, the temperature sensors should not be touching the coils (i.e., spaced-apart from the coils). Additionally, the PCB 128 need not be centrally located but can be over center, such as overlapping two or more of the coils.

Figure 3:
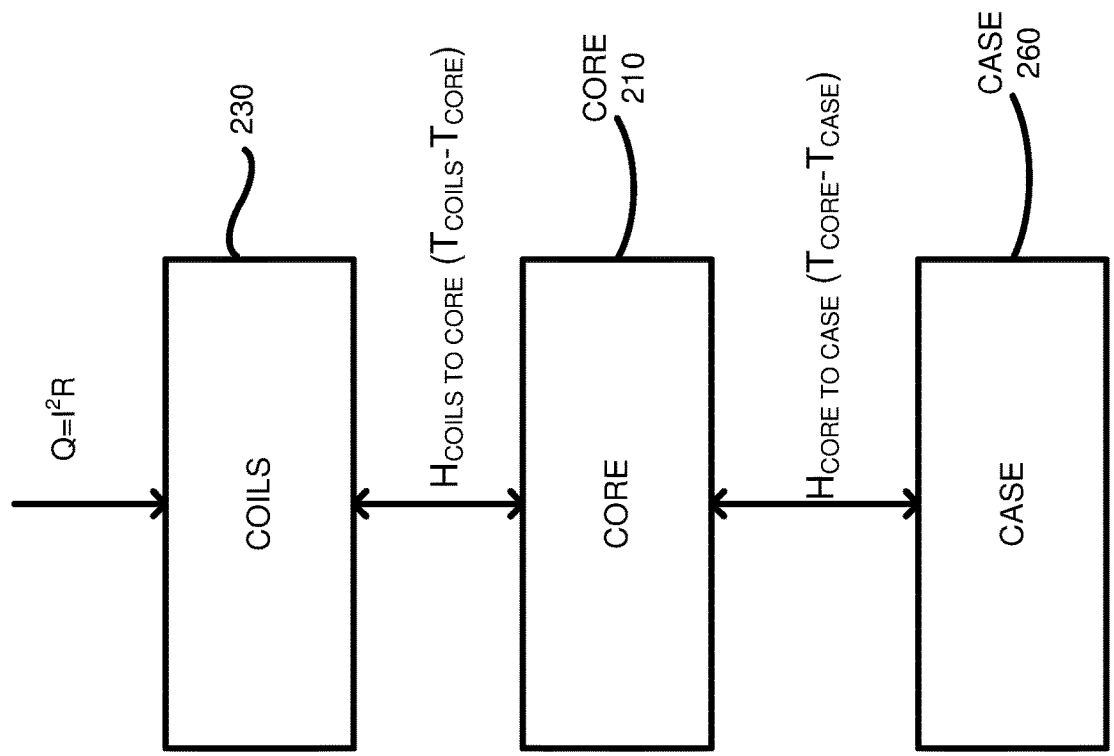
FIG. 3 is an example of a three-body model used to estimate the temperature of the coils using a single temperature sensor.

FIG. 3 shows a three-body thermal model of the motor. For the purpose of explanation, these bodies are referred to as the coils 230, core 210, and case 260; however, it is understood that the core and case bodies in the thermal model are an abstraction and do not necessarily correspond to the core and case components of the physical motor assembly.

As shown in FIG. 3, the coils body is thermally connected to the core body, and the core body is thermally connected to the case body. The coils generate heat due to resistive heating. It is assumed that the temperature of the case body can be measured directly (via the thermocouple/temperature sensor on the motor's PCB), but the temperature of the other two bodies are not observable. This leads to a two-dimensional state vector for the thermal model: $\vec{T}=[T_{Coils}\ T_{Core}]^T$.

The three-body formulation is a model that can accurately capture the thermal dynamics of the motor coils. Capturing these dynamics requires a latent body (the "core" body) and a means of incorporating the thermocouple measurement from the PCB (the "case" body).

The following table includes a description of the various parameters:

| Quantity | Units | Description |
| --- | --- | --- |
| q | Watts | The rate of heat generation in the coils ($I^2R$) |
| $T_{Coils}$ | C | The (uniform) temperature of the coils. |
| $T_{Core}$ | C | The (uniform) temperature of the core. |
| $T_{Case}$ | C | The temperature reported by the motor's thermocouple (actually located on the PCB). |
| $m_{Coils}$ | Joules/C | The thermal mass of the coils. |
| $m_{Core}$ | Joules/C | The thermal mass of the core. |
| $h_{Coils \to Core}$ | Watts/C | Heat transfer coefficient. |
| $h_{Core \to Case}$ | Watts/C | Heat transfer coefficient. |

The three-body thermal model can be expressed as a system of linear ordinary differential equations:

$$m_{Coils}\frac{dT_{Coils}}{dt} = q - h_{Coils \to Core}(T_{Coils} - T_{Core})$$

$$m_{Core}\frac{dT_{Core}}{dt} = h_{Coils \to Core}(T_{Coils} - T_{Core}) - h_{Core \to Case}(T_{Core} - T_{Case}).$$

Or, in matrix notation:

$$\frac{d\vec{T}}{dt} = A\vec{T} + B\vec{r},$$

where, $$\vec{T} = \begin{bmatrix} T_{Coils} \\ T_{Core} \end{bmatrix}, A = \begin{bmatrix} -\frac{h_{Coils \to Core}}{m_{Coils}} & \frac{h_{Coils \to Core}}{m_{Coils}} \\ \frac{h_{Coils \to Core}}{m_{Core}} & -\frac{h_{Coils \to Core} - h_{Core \to Case}}{m_{Core}} \end{bmatrix},$$

$$B = \begin{bmatrix} \frac{1}{m_{Coils}} & 0 \\ 0 & \frac{h_{Core \to Case}}{m_{Core}} \end{bmatrix}, \vec{r}\begin{bmatrix} q \\ T_{Case} \end{bmatrix}.$$

This system of equations can be integrated in time to provide a real-time estimate of the unobserved coil temperature using only the observable quantities q and $T_{case}$.

As mentioned previously, one benefit of using a model to estimate the coil temperature is a simplified mechanical design and reduced cost. Another benefit of using a model is that it becomes possible to predict the future temperature of the coils corresponding to assumed future values of q and $T_{Case}$. This makes it possible to calculate $q_{max}$, the maximum constant power that can be applied for a specified time duration while ensuring that $T_{Coils} <= T_{max}$. The electrical current supplied to the motors can then be limited to ensure that $q <= q_{max}$.

The first step in developing this current limiter is to form the analytical solution with constant q (since $q_{max}$ is constant by definition) and constant $T_{case}$ (which is a reasonable assumption for short time durations).

Assuming that both q and $T_{Case}$ are constant, the above equations are simplified by introducing the constant vector $\vec{b}$ $$\vec{b} = B\vec{r}_{constant}$$

Next, the eigenvalue decomposition of A is introduced $$A = V \wedge V^{-1},$$

where V contains the right eigenvectors and $\wedge$ is a diagonal matrix of the corresponding eigenvalues. It is then possible to decouple the system of equations by introducing a change of variables:

$$\vec{T} = V\vec{y}.$$

Introducing this change of variables into the previous equation yields:

$$V\frac{d\vec{y}}{dt} = AV\vec{y} + \vec{b},$$

$$\frac{d\vec{y}}{dt} = V^{-1}AV\vec{y} + V^{-1}\vec{b},$$

$$\frac{d\vec{y}}{dt} = \wedge\vec{y} + V^{-1}\vec{b},$$

The solution to each of these equations is:

$$y_i = \mu_i e^{\lambda_i t} + \rho_i.$$

Evaluation of $$\vec{T}\Big|_{t=0} \text{ and } \frac{d\vec{T}}{dt}\Big|_{t=0}$$

yields:

$$\vec{T}(t) = V \begin{bmatrix} e^{\lambda_1 t} & 0 \\ 0 & e^{\lambda_2 t} \end{bmatrix} V^{-1}\left(\vec{T}\Big|_{t=0} + A^{-1}\vec{b}\right) - A^{-1}\vec{b}.$$

The equation can be solved for the constant power, $q_{max}$, that yields $T_{Coils} = T_{max}$ at a specified time $t_{eval}$:

$$\vec{T}(t_{eval}) = V \begin{bmatrix} e^{\lambda_1 t_{eval}} & 0 \\ 0 & e^{\lambda_2 t_{eval}} \end{bmatrix} V^{-1}\left(\vec{T}\Big|_{t=0} + A^{-1}\vec{b}\right) - A^{-1}\vec{b},$$

$$\begin{bmatrix} T_{max} \\ T_{Core|t=t_{eval}} \end{bmatrix} = V \begin{bmatrix} e^{\lambda_1 t_{eval}} & 0 \\ 0 & e^{\lambda_2 t_{eval}} \end{bmatrix} V^{-1}\left(\vec{T}\Big|_{t=0} + A^{-1}B\begin{bmatrix} q_{max} \\ T_{Case|t=0} \end{bmatrix}\right) - A^{-1}B\begin{bmatrix} q_{max} \\ T_{Case|t=0} \end{bmatrix}.$$

The second equation can be eliminated since it is not needed to solve for $q_{max}$.

$$[1 \ 0]\begin{bmatrix} T_{max} \\ T_{Core|t=t_{eval}} \end{bmatrix} = [1 \ 0]\left(V\begin{bmatrix} e^{\lambda_1 t_{eval}} & 0 \\ 0 & e^{\lambda_2 t_{eval}} \end{bmatrix}V^{-1}\left(\vec{T}\Big|_{t=0} + A^{-1}B\begin{bmatrix} q_{max} \\ T_{Case|t=0} \end{bmatrix}\right) - A^{-1}B\begin{bmatrix} q_{max} \\ T_{Case|t=0} \end{bmatrix}\right),$$

$$T_{max} = [1 \ 0]\left(V\begin{bmatrix} e^{\lambda_1 t_{eval}} & 0 \\ 0 & e^{\lambda_2 t_{eval}} \end{bmatrix}V^{-1}\left(\vec{T}\Big|_{t=0} + A^{-1}B\begin{bmatrix} q_{max} \\ T_{Case|t=0} \end{bmatrix}\right) - A^{-1}B\begin{bmatrix} q_{max} \\ T_{Case|t=0} \end{bmatrix}\right).$$

Solving for $q_{max}$ in the above equation yields $$q_{max} = \frac{1}{\alpha_1}\left(\vec{B}^T\vec{T}\Big|_{t=0} - \alpha_2 T_{Case}\Big|_{t=0} - T_{max}\right),$$

where the terms $\vec{\alpha}$ and $\vec{\beta}$ can be precomputed:

$$\vec{\alpha}^T = [\alpha_1 \ \alpha_2] = [1 \ 0]\left(I - V\begin{bmatrix} e^{\lambda_1 t_{eval}} & 0 \\ 0 & e^{\lambda_2 t_{eval}} \end{bmatrix}V^{-1}\right)A^{-1}B,$$

$$\vec{\beta}^T = [\beta_1 \ \beta_2] = [1 \ 0]V\begin{bmatrix} e^{\lambda_1 t_{eval}} & 0 \\ 0 & e^{\lambda_2 t_{eval}} \end{bmatrix}V^{-1}.$$

Note that this equation is a linear combination of motor temperatures at t=0 with constant coefficients that can be precomputed.

One additional quantity of interest is the amount of time that the robot can operate with a constant high torque on all of the wheels before overheating. This quantity is termed the "high torque maneuver budget", or just the "maneuver budget".

While the power limit lends itself to a simple analytical expression that can be readily computed in real-time, the maneuver budget is more complicated to solve mathematically. However, the maneuver budget can be calculated using an iterative scheme. This is possible because the maneuver budget can be reported with coarse resolution (e.g. integer seconds), the maneuver budget is a slowly varying quantity, and the update loop runs at a high frequency. A simple iterative approach to calculating the maneuver budget is outlined in Algorithm 4, below. In one embodiment, a number of seconds is chosen and the heat computed to determine if the maximum temperature is exceeded. If so, then 1 second less is used to calculate the temperature. This process is repeated until a number of seconds is found that does not overheat the coils.

---

Algorithmn 1 Current Limiter Outer Loop

Input:
$$A = \begin{bmatrix} a_{11} & a_{12} \\ a_{21} & a_{22} \end{bmatrix}, B = \begin{bmatrix} b_{11} & 0 \\ 0 & b_{22} \end{bmatrix}, V^{-1}, \lambda_1, \lambda_2,$$

$$\vec{\gamma}^T = [1 \ 0]V, \vec{\zeta} = A^{-1}B\begin{bmatrix} g_{maneuver} \\ 0 \end{bmatrix}, \vec{\eta} = A^{-1}B\begin{bmatrix} 0 \\ 1 \end{bmatrix},$$

$$\vec{\alpha}^T = [1 \ 0]\left(I - V\begin{bmatrix} e^{\lambda_1 t_{eval}} & 0 \\ 0 & e^{\lambda_2 t_{eval}} \end{bmatrix}V^{-1}\right)A^{-1}B,$$

$$\vec{\beta}^T = [1 \ 0]V\begin{bmatrix} e^{\lambda_1 t_{eval}} & 0 \\ 0 & e^{\lambda_2 t_{eval}} \end{bmatrix}V^{-1},$$

$T_{max}$ (the max coil temperature), $T_{Core,0}$ (the assumed initial temperature of the core), $q_{safe}$ (an "always safe" power level), and $t_{resolution}$ (the resolution of the maneuver budget).

1: $t_{maneuver} = 0$

2: $\vec{T} = \begin{bmatrix} T_{max} \\ T_{Core,0} \end{bmatrix}$

3: $q_{max} = q_{safe}$
4: Loop
5: ...
6:   q = GetAveragePowerSinceLastUpdate( )
7:   dt = GetElapsedTimeSinceLastUpdate( )
8:   $T_{Case}$ = GetThermocoupleTemperature( )
9:   ...
10:   $\vec{T}$ = UpdateThermalModelState($\vec{T}$, $T_{Case}$, A, B, q, dt) // Alg. 2
11:   $q_{max}$ = UpdatePowerLimit($\vec{T}$, $T_{Case}$, $T_{max}$, $q_{safe}$, $\vec{\alpha}^T$, $\vec{\beta}^T$) // Alg. 3
12:   $t_{maneuver}$ = UpdateManeuverBudget($\vec{T}$, $T_{Case}$, $T_{max}$, $t_{maneuver}$, $t_{resolution}$, $\lambda_1, \lambda_2, V^{-1}, \vec{\gamma}^T, \vec{\xi}, \vec{\eta}$) // Alg. 4
13:   ...
14: end loop

---

ALGORITHM 2 First order update to the thermal model

Input: $\vec{T}$, $T_{Case}$, A, B, q, dt
Output: Updated $\vec{T}$

1: $\vec{b} = B\begin{bmatrix} q \\ T_{Case} \end{bmatrix}$

2: return $\vec{T}$ + dt $(A\vec{T} + \vec{b})$

---
ALGORITHM 3 Compute the power limit
---

Input: $\vec{T}$, $T_{Case}$, $T_{max}$, $q_{safe}$, $\vec{\alpha}^T = [\alpha_1 \ \alpha_2]$, $\vec{\beta}^T$.
Output: $q_{max}$ 1: $q_{max} = \frac{1}{\alpha_1}\left(\vec{\beta}^T \vec{T} - \alpha_2 T_{Case} - T_{max}\right)$ 2: return min ($q_{max}$, $q_{safe}$)

---
ALGORITHM 4 Update the maneuver budget
---

Figure 4:
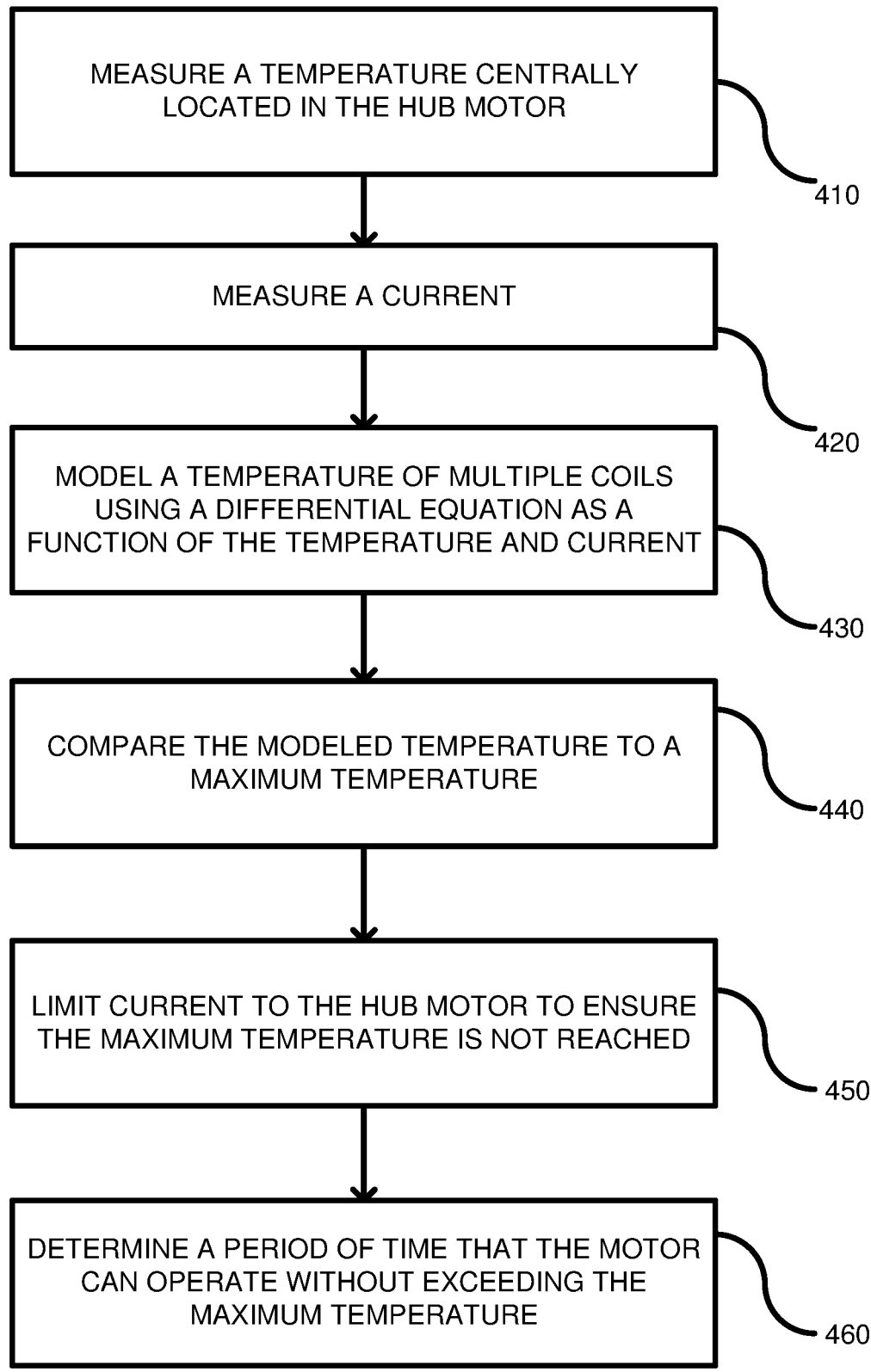
FIG. 4 is a flowchart according to one embodiment for controlling the temperature of motor coils by limiting current using a thermal model of the coil temperature.

Input: $\vec{T}$, $T_{Case}$, $T_{max}$, $t_{maneuver}$, $t_{resolution}$, $\lambda_1$, $\lambda_2$, $V^{-1}$, $\vec{\gamma}^T$, $\vec{\zeta}$, and $\vec{\eta}$.
Output: Updated $t_{maneuver}$
1: $\vec{\kappa} = \vec{\zeta} + \vec{\eta} T_{Case}$
2: $\vec{\mu} = \vec{T} + \vec{\kappa}$ 3: $\vec{v}_1^T = \vec{\gamma}^T \begin{bmatrix} e^{\lambda_1 t_{maneuver}} & 0 \\ 0 & e^{\lambda_2 t_{maneuver}} \end{bmatrix} V^{-1}$ 4: $\vec{v}_2^T = \vec{\gamma}^T \begin{bmatrix} e^{\lambda_1 (t_{maneuver}+t_{resolution})} & 0 \\ 0 & e^{\lambda_2 (t_{maneuver}+t_{resolution})} \end{bmatrix} V^{-1}$ 5: $T_{Coils,1} = \vec{v}_1^T \vec{\mu} - [1 \ 0] \vec{\kappa}$
6: $T_{Coils,2} = \vec{v}_2^T \vec{\mu} - [1 \ 0] \vec{\kappa}$ 7: if $T_{Coils,1} > T_{max}$ then
8:    return max (0 s, $t_{maneuver} - t_{resolution}$)
9: else if $T_{Coils,2} > T_{max}$ then
10:   return $t_{maneuver}$
11: else
12:   return min ($t_{maneuver} + t_{resolution}$, 30 s)
13: end if The four unknown modeling parameters $m_{Coils}$, $m_{Core}$, $h_{Coils \to Core}$, and $h_{Core \to Case}$ can be determined by fitting the thermal model to empirical data. The equation below poses a constrained optimization problem for determining these four parameters from empirical data. The objective function is the least squares error between the model and the empirical data. The model is constrained to be conservative (i.e. no under-prediction of coil temperature) and the values of each unknown parameter are required to fall within specified ranges.

$$\min_{\begin{bmatrix} m_{Coils} \\ m_{Core} \\ h_{Coils \to Core} \\ h_{Core \to Case} \end{bmatrix} \in R^4} \sum_{i=1}^{n} (T_{Coils,measured} - T_{Coils,model})_i^2$$

s.t. $(T_{Coils,measured} - T_{Coils,model})_i <= 0, i \in \{1, \ldots, n\}$ $m_{Coils,min} <= m_{Coils} <= m_{Coils,max}$
$m_{Core,min} <= m_{Core} <= m_{Core,max}$
$h_{Coils \to Core,min} <= h_{Coils \to Core} <= h_{Coils \to Core,max}$
$h_{Core \to Case,min} <= h_{Core \to Case} <= h_{Core \to Case,max}$ FIG. 4 is a flowchart according to one embodiment for limiting current to a motor. In process block 410, a temperature is measured with a sensor that is centrally located in the hub motor. By centrally located, it is intended that each of the coils 230 on the spokes 220 contribute relatively equally to the measured temperature. The temperature can be measured using a thermocouple or other temperature measuring device that is spaced-apart from multiple coils. In process block 420, a current is measured using one or more current measuring devices, such as a low value resistor placed in line with the coil and its corresponding voltage measured with an analog-to-digital converter or other circuitry for detecting an applied current (e.g., a hall-effect sensor). Current can be measured for each individual hub motor or an overall current can be measured for all of the hub motors, and then the current averaged. For example, in FIG. 1, the current measurement 160 measures a current from the battery 150 distributed to all of the hub motors 120, 122, 124, and 126 and the result is divided by four. By contrast, the current measurement 162 is measured to individual hub motors. In process block 430, a temperature of multiple coils is modeled using a differential equation as a function of temperature and current. For example, the following equation can be used, as was described above:

$$\frac{d\vec{T}}{dt} = A\vec{T} + B\vec{r},$$

For example, in FIG. 2, the multiple coils 230 are modeled. The measured temperature (e.g., the case temperature) and the measured current are input into the equation to calculate a modeled temperature. In process block 440, the modeled temperature is compared to a maximum temperature, which is a temperature the coils should not exceed. In process block 450, current is limited to the hub motor to ensure the maximum temperature is not reached. In FIG. 1, the central controller 140 can limit the current based on the comparison so that the temperature of the coils does not become too hot. In process block 460, a period of time is determined that the motor can operate at a fixed current level (e.g., current required for maximum torque) without exceeding the maximum temperature. Thus, the above equations can be used with a maximum temperature and desired current to compute an amount of time that the motor can operate.

Figure 5:
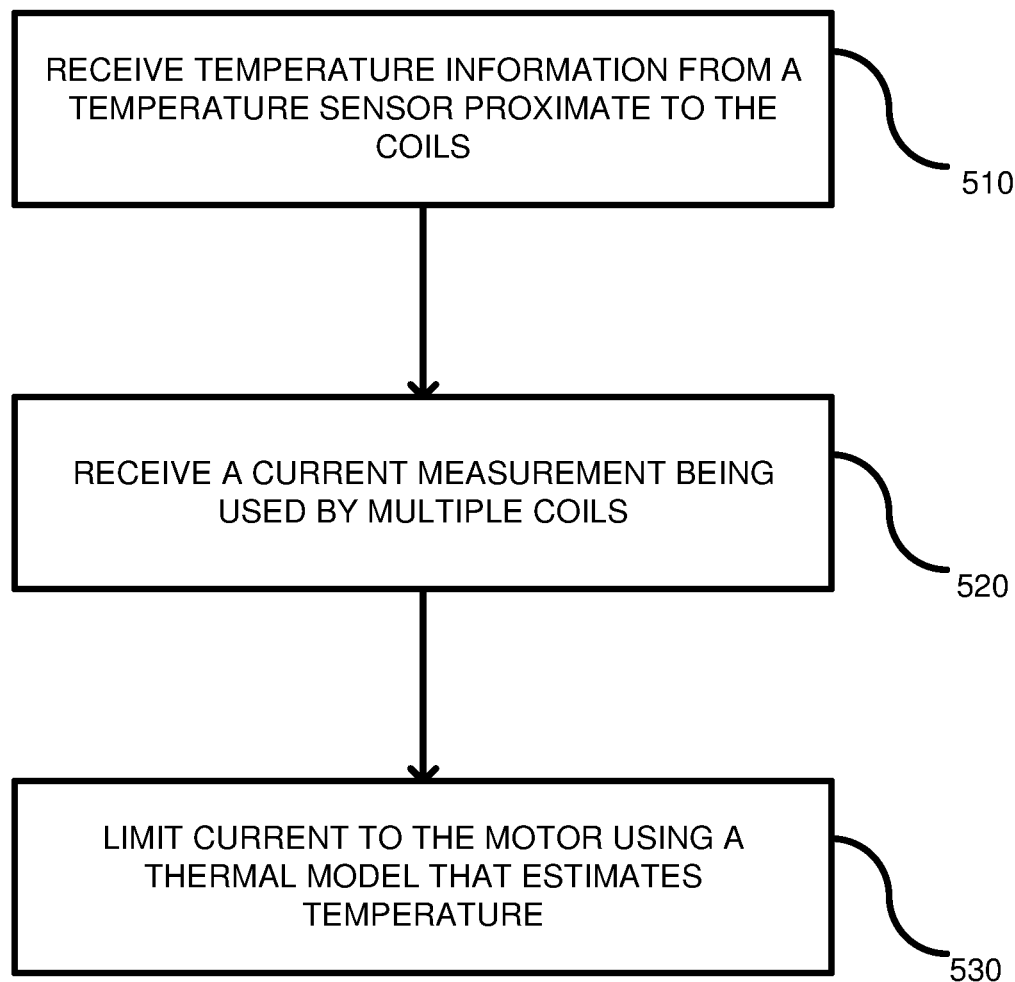
FIG. 5 is a flowchart according to another embodiment for limiting current using a thermal model of the coil temperature.

FIG. 5 is a flowchart according to another embodiment. In process block 510, temperature information is received from a temperature sensor proximate to the coils. For example, in FIG. 1, the temperature sensor 136 is positioned on the PCB 128 of the motor. The temperature sensor 136 can also be positioned on the case 260 or another position where temperature reflects multiple coils 230 in the hub motor. In process block 520, a current is received by a measurement being used by the multiple coils. For example, the current can be measured by a current measurement device 162 positioned between a central controller 140 and a PCB 128, as indicated in FIG. 1. In process block 530, current is limited to the hub motor using a thermal model that estimates temperature. For example, the thermal model 142 is used to determine a temperature of coils in the motors 120, 122, 124, and 126. When it is determined that the temperature exceeds a threshold, the current can be limited to reduce the temperature. The thermal model can also be used to determine an amount of time that maximum current can be applied before the threshold is exceeded.

Figure 6:
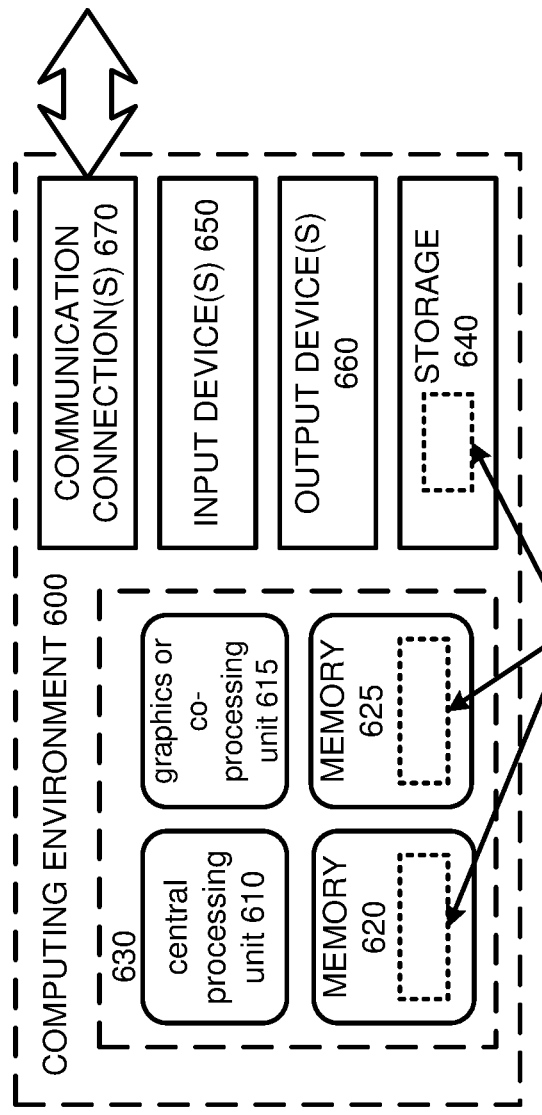
FIG. 6 depicts a generalized example of a suitable computing environment in which the described innovations may be implemented.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices. In one example, the computing environment 600 is a robot operating four or more hub motors.

With reference to FIG. 6, the computing environment 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s). For example, the computing environment 600 can be used as a remote unit that is in wireless communication with the central controller 140 to control movement of the robot 100. Additionally, any components of the computing environment can be used as part of the central controller 140.

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes solid state volatile or non-volatile memory or any other medium which can be used to store information in a non-transitory way and which can be accessed within the computing environment 600. The storage 640 stores instructions for the software 680 implementing one or more innovations described herein.

The input device(s) 650 may be a touch input device such as a touch screen, a voice input device, or another device that provides input to the computing environment 600. The output device(s) 660 may be a display, a speaker, or another device that provides output from the computing environment 600.

The communication connection(s) 670 enable communication over a communication medium to another computing entity, such as a robot controller with joy-stick controls. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., volatile memory components (such as DRAM or SRAM), or non-volatile memory components (such as flash memory)) and executed on a computer device, such as within a robot. The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded or other software application (such as a remote computing application). For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of limiting current in a motor, the method comprising:
   measuring a temperature of a temperature sensor located inside a hub motor, the hub motor including multiple coils and a core coupled to the multiple coils;
   measuring a current being used by the hub motor;
   modeling a temperature of the multiple coils using a differential equation to calculate a temperature of the multiple coils as a function of the measured temperature and the measured current;
   comparing the calculated temperature, as modeled, to a maximum temperature;
   limiting current to the hub motor to ensure that the maximum temperature is not exceeded; and
   determining a period of time that the motor can operate at a predetermined current without exceeding the maximum temperature.

2. The method of claim 1, wherein the temperature sensor is not touching any of the multiple coils.

3. The method of claim 1, wherein the modeling of the temperature includes modeling a temperature of a mass that exchanges heat with the coils and a body at the measured temperature.

4. The method of claim 1, wherein the differential equation has a form as follows:

$$\frac{d\vec{T}}{dt} = A\vec{T} + B\vec{r},$$

wherein T relates to a temperature of the multiple coils and a thermal body, A relates to heat transfer coefficients and masses of the coils and the thermal body, B relates to a heat transfer coefficient of the thermal body to a body having the temperature sensor coupled thereto and a mass of the coils, and r relates to the current and the measured temperature.

5. The method of claim 1, wherein the temperature sensor is positioned on a printed circuit board that is spaced apart from the multiple coils.

6. A method of limiting current in a motor, the method comprising:
   receiving temperature information from a temperature sensor spaced-apart from multiple coils used in the motor;
   receiving a current measurement of a current being used by the multiple coils of the motor;
   calculating an amount of time available before a threshold temperature of the multiple coils is reached using the current measurement; and
   limiting the current to the motor using a thermal model that estimates temperature of the multiple coils based on the temperature information and the current measurement.

7. The method of claim 6, further including calculating a power limit using the thermal model that maintains a temperature of the multiple coils below a temperature threshold.

8. The method of claim 6, wherein the thermal model includes modeling a temperature of a thermal body associated with the multiple coils and modeling a temperature of the multiple coils.

9. The method of claim 6, wherein the temperature sensor is positioned inside the motor.

10. The method of claim 9, wherein the temperature sensor is on a Printed Circuit Board (PCB) coupled to a central controller that controls multiple motors.

11. The method of claim 6, wherein the motor is a hub motor.

12. The method of claim 6, wherein the thermal model is a three-body model including the multiple coils and one of the three bodies has its temperature measured.

13. The method of claim 6, wherein the thermal model is a differential equation that includes heat transfer coefficients from the multiple coils to the core, a mass of a core of the motor and a mass of the multiple coils.

14. A system for controlling movement of a motorized vehicle, comprising:
   a memory for storing executable instructions
   a processor for executing the executable instructions to:
   receive a measured temperature value from a body that is thermally coupled to a set of motor coils in a motor;
   receive a measurement of current supplied by a battery and applied to the motor;
   use the measured temperature and current applied in a thermal model that predicts a current temperature of the motor coils to determine one or more of a power limit that specifies a maximum power that can be applied to the motor to keep the coils at a temperature below a maximum temperature and a maneuver budget that specifies a time for which a predetermine power level can be applied to the motor before the coils exceed the maximum coil temperature; and
   provide one or more of the maximum power and the maneuver budget to an operating system of the motorized vehicle.

15. The system of claim 14, wherein the thermal model is a three-body model.

16. The system of claim 14, wherein the thermal model is a differential equation that includes parameters related to a heat transfer from a thermal body to the set motor coils and a mass of the thermal body and a mass of the coils.

17. The system of claim 14, wherein the measured temperature is obtained from a temperature sensor located on a Printed Circuit Board (PCB) within the motor.

18. The system of claim 16, wherein the thermal model is a three-body model including the set of motor coils, a first thermal body, which exchanges heat with the set of motor coils, and a second thermal body, which has its temperature measured by the temperature sensor.

19. The system of claim 14, wherein the operating system limits current to the motor based on the determination of whether the temperature of the set of motor coils exceeds the maximum temperature.

20. A method of limiting current in a motor, the method comprising:
   receiving temperature information from a temperature sensor spaced-apart from multiple coils used in the motor;
   receiving a current measurement of a current being used by the multiple coils of the motor; and
   limiting the current to the motor using a thermal model that estimates temperature of the multiple coils based on the temperature information and the current measurement;
   wherein the thermal model is a differential equation that includes heat transfer coefficients from the multiple coils to the core, a mass of a core of the motor and a mass of the multiple coils.

* * * * *

UNITED STATES PATENT AND TRADEMARK OFFICE
CERTIFICATE OF CORRECTION

| | |
|---|---|
| PATENT NO. | : 11,362,615 B1 |
| APPLICATION NO. | : 16/914865 |
| DATED | : June 14, 2022 |
| INVENTOR(S) | : Washabaugh et al. |

It is certified that error appears in the above-identified patent and that said Letters Patent is hereby corrected as shown below:

In the Claims

Column 12,
Line 26, Claim 14, "predetermine" should be --predetermined--

Signed and Sealed this
Fourteenth Day of February, 2023

Katherine Kelly Vidal
*Director of the United States Patent and Trademark Office*